A. W. BOHAKER.
Harrows.
No. 133,623. Patented Dec. 3, 1872.
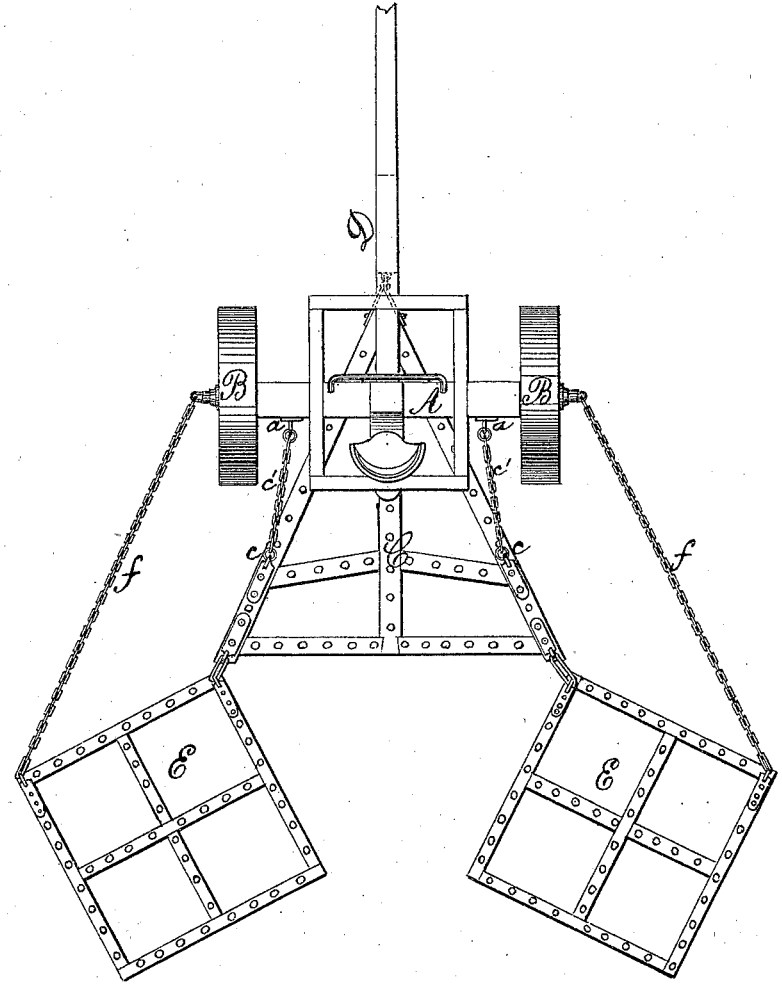
WITNESSES: INVENTOR:

UNITED STATES PATENT OFFICE.

ANDREAS W. BOHAKER, OF NAPA, CALIFORNIA.

IMPROVEMENT IN HARROWS.

Specification forming part of Letters Patent No. 133,623, dated December 3, 1872.

*To all whom it may concern:*

Be it known that I, ANDREAS W. BOHAKER, of Napa, in the county of Napa and State of California, have invented a certain Improvement in Gang-Harrows, of which the following is a specification:

This invention belongs to that class of harrows in which two or more separate parts are combined for harrowing a strip of ground of greater or less width, as may be desired. To this end the invention consists in the arrangement of a front harrow placed between a pair of wheels mounted on an axle, with rear harrows coupled to the corners of the front harrow behind the wheels—a situation where the harrows are free to expand—and with chains connecting the outer corners of the harrows with the ends of the axle; all which I will now proceed to describe.

Figure 1 is a plan view.

A is the axle aforesaid, and B the wheels on which it is mounted. In the rear side of this axle are fixed eyes $a$ to receive hooks on the ends of chains $c'$ that are connected at their rear ends with eyes $c$, fixed to the side pieces of a triangular harrow, C, that lies between the wheels B, partly under the axle A, its front end being connected by a chain with a hook in a block affixed to the under side of the tongue D. This front chain is more to regulate than to draw, though it can be used in rough land to raise the point of the harrow. A roller is mounted in a recess in the block to prevent the latter from striking forcibly when going over high obstacles. E E are square harrows, attached by chains fastened to one corner of each to the rear corners of the triangular harrow C. Regulating-chains $f$ are stretched between the ends of the axle A and the outer corners of the harrows E, by lengthening which chains the harrows E are allowed to fall more in rear of the harrow C, and by shortening the chains the harrows E are made to travel further outside of the harrow C, so that the path traversed by the three harrows can be widened or narrowed at pleasure, and on removing the regulating-chains altogether the three harrows give a double harrowing to the same ground. If the ground is so rough as to require it, a weight can be placed on the harrow C in order to more thoroughly break the lumps, when the harrows E will effect the finer pulverization.

A full-sized machine will harrow a space nineteen feet wide, and requires from four to six horses, according to the nature of the ground, and but one man.

I claim as my invention—

The arrangement of the harrow C placed between the wheels of the drawing apparatus, the harrows E coupled to the rear corners of the harrow C behind the wheels, and the chains $f$ used to connect the ends of the axle with the outer corners of the harrows E, all substantially as described.

ANDREAS W. BOHAKER.

Witnesses:
R. BURNELL,
J. E. POND.